United States Patent
Barry et al.

(10) Patent No.: US 10,217,062 B2
(45) Date of Patent: Feb. 26, 2019

(54) SYSTEM AND METHOD FOR PROVIDING EFFICIENCY SCORES FOR AIRSPACE

(75) Inventors: James Barry, Madison, CT (US); James Cole, East Setauket, NY (US); Jeffrey Devaney, Sandy Hook, CT (US)

(73) Assignee: PASSUR Aerospace, Inc., Stamford, CT (US)

( * ) Notice: Subject to any disclaimer, the term of this patent is extended or adjusted under 35 U.S.C. 154(b) by 1450 days.

(21) Appl. No.: 11/931,952

(22) Filed: Oct. 31, 2007

(65) Prior Publication Data

US 2008/0120170 A1 May 22, 2008

Related U.S. Application Data

(63) Continuation-in-part of application No. 11/863,716, filed on Sep. 28, 2007, now Pat. No. 7,890,247.

(60) Provisional application No. 60/855,713, filed on Oct. 31, 2006.

(51) Int. Cl.
*G06Q 10/00* (2012.01)
*G06Q 10/06* (2012.01)

(52) U.S. Cl.
CPC ......... *G06Q 10/00* (2013.01); *G06Q 10/0639* (2013.01)

(58) Field of Classification Search
CPC combination set(s) only.
See application file for complete search history.

(56) References Cited

U.S. PATENT DOCUMENTS

| | | | |
|---|---|---|---|
| 6,789,011 B2* | 9/2004 | Baiada | G08G 5/0043 342/34 |
| 7,412,324 B1* | 8/2008 | Bagge et al. | 701/120 |
| 7,890,247 B2* | 2/2011 | Cole | 701/120 |
| 2003/0139875 A1* | 7/2003 | Baiada | G08G 5/0043 701/120 |
| 2004/0193362 A1* | 9/2004 | Baiada et al. | 701/120 |
| 2004/0244633 A1* | 12/2004 | Witmer | 104/93 |
| 2005/0090969 A1* | 4/2005 | Siok et al. | 701/120 |

OTHER PUBLICATIONS

Sarkis, "An analysis of the operational efficiency of major airports in the United States", Journal of Operations Management 18 (2000), pp. 335-351.*

* cited by examiner

*Primary Examiner* — Thomas L Mansfield
(74) *Attorney, Agent, or Firm* — Fay Kaplun & Marcin, LLP

(57) ABSTRACT

A system and method for determining a current efficiency score for an airport, receiving a request to compare the current efficiency score with a previous efficiency score, retrieving the previous efficiency score and displaying the current efficiency score and the previous efficiency score to a user. Also, a system having a database storing a plurality of previous efficiency scores for an airport, a calculation arrangement calculating a current efficiency score for the airport and retrieving a previous efficiency score from the database and a data distribution arrangement for generating a displayable file and distributing the current efficiency score and the one of the plurality of previous efficiency scores to a user of the system.

20 Claims, 3 Drawing Sheets

SYSTEM AND METHOD FOR PROVIDING EFFICIENCY SCORES FOR AIRSPACE

PRIORITY CLAIM/INCORPORATION BY REFERENCE

This application claims the benefit of U.S. Provisional Patent Application 60/855,713, filed on Oct. 31, 2006, and entitled "System and Method for Providing Efficiency Scores for Airspace," which is expressly incorporated herein, in its entirety, by reference.

This application is a continuation-in-part of U.S. patent application Ser. No. 11/863,716, filed on Sep. 28, 2007, now U.S. Pat. No. 7,890,247 and entitled "System and Method for Filling Available Airspace," which is expressly incorporated herein, in its entirety, by reference.

FIELD OF INVENTION

The present invention relates generally to systems and methods for providing historical efficiency scores for airspace.

BACKGROUND

Airport delays may be caused by a variety of factors including poor weather, lack of available gates, flight overload, or general inefficient operation. In order to reduce airport delays, airlines and airport operators need to improve efficiency whenever possible.

SUMMARY OF THE INVENTION

A method for determining a current efficiency score for an airport, receiving a request to compare the current efficiency score with a previous efficiency score, retrieving the previous efficiency score and displaying the current efficiency score and the previous efficiency score to a user.

Also, a system having a database storing a plurality of previous efficiency scores for an airport, a calculation arrangement calculating a current efficiency score for the airport and retrieving a previous efficiency score from the database and a data distribution arrangement for generating a displayable file and distributing the current efficiency score and the one of the plurality of previous efficiency scores to a user of the system.

DETAILED DESCRIPTION

Figure 1:
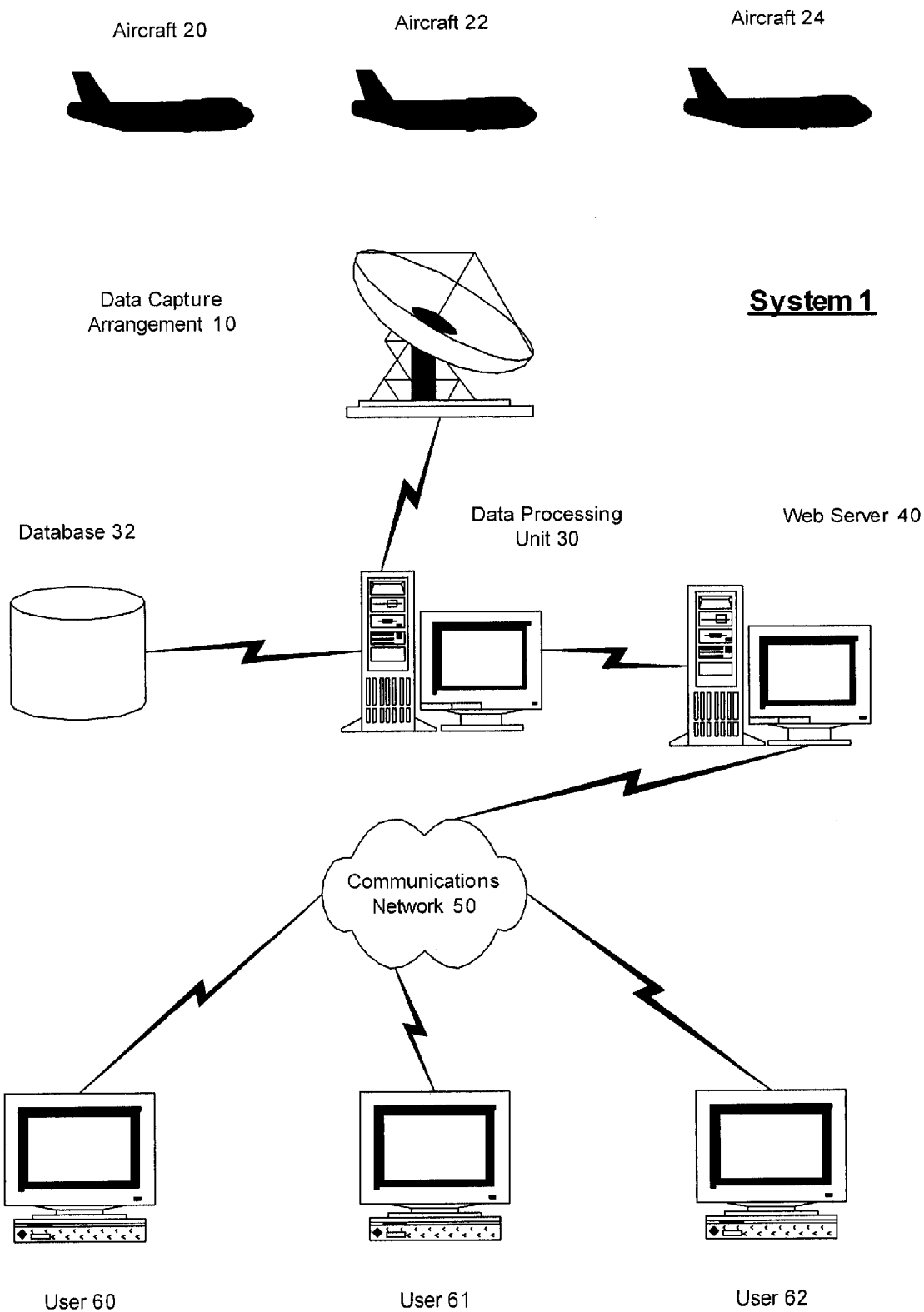
FIG. 1 shows an exemplary embodiment of a system according to the present invention.

The exemplary embodiments of the present invention may be further understood with reference to the following description and the appended drawings, wherein like elements are referred to with the same reference numerals. The exemplary embodiments of the present invention describe systems and methods for providing historical efficiency scores for airspace. In the exemplary embodiments, efficiency scores are archived and retrieved for comparison to current scores.

FIG. 1 illustrates an exemplary system 1 according to the present invention. A data capture arrangement 10 obtains data relating to the operation of a plurality of aircraft 20, 22 and 24. In this exemplary embodiment, the data capture arrangement 10 may include one or more Passive Secondary Surveillance Radar ("PSSR") systems. A PSSR system may be, for example, the PASSUR® system sold by Megadata Corporation of Greenwich, Conn. Data collected by the data capture arrangement 10 may include, but is not limited to, a location of arriving aircraft. Those skilled in the art will understand that the exemplary embodiments are described with reference to a PSSR system. However, the present invention is not limited to collecting location data using a PSSR system. The data capture arrangement may be any system that collects, directly or indirectly, location data on aircraft. Such systems may include airline radar systems, multilateration systems, etc.

With the exception of many small airports that serve general aviation, larger airports generally have a Secondary Surveillance Radar ("SSR") system. SSR includes a rotating radar that sends interrogation signals at a frequency of 1030 MHz to aircraft in the vicinity of the airport. Transponders aboard aircraft respond to the interrogations by transmitting a response signal back to the radar at a frequency of 1090 MHz. In addition to the SSR, a PSSR may be sited near the airport grounds. PSSR may include two antenna systems: a fixed, directional high gain 1030 MHz antenna aimed toward the SSR for receiving the interrogation signals; and a stationary array of directive antennas arranged in a circle to detect the 1090 MHz responses from the aircraft transponders. PSSR's may be placed at known distances and directions from a corresponding SSR.

Using the time relationships between received signals (i.e., the interrogations and responses, the known distances from the SSR, and the known direction from each PSSR to the SSR), the PSSR determines the location of aircraft relative to a reference location, e.g., the airport. Response signals from the aircraft received by PSSR include Mode A transponder beacon signals, Mode C transponder beacon signals and Mode S transponder beacon signals. The Mode A signal comprises a four (4) digit code which is the beacon code identification for the aircraft. The Mode C signal additionally includes altitude data for the aircraft. The Mode S signal is either a 56 bit surveillance format having a 32 bit data/command field and a 24 bit address/parity field or a 112-bit format allow for the transmission of additional data in a larger data/command field. PSSR receives the beacon code and altitude data from the received signals and calculates aircraft position (e.g., range, azimuth) and ground speed based on the timing of the receipt of the signals and the known radar locations. Thus, position information or target data points for each of the aircraft is derived based on the physical characteristics of the incoming signals, rather than based on position data contained in the signal itself.

The data capture arrangement 10 conveys some or all of the recorded data to a processing unit 30. The processing unit 30 may be, for example, a standard PC-based server system running an operating system such as LINUX. Those skilled in the art will understand that any computing platform may be used for the processing unit 30. The processing unit 30 communicates with a database 32, which may be internal to the processing unit 30 or may be a separate component located locally or remotely. The processing unit 30 analyzes the raw data from the data capture arrangement to determine one or more results requested by users 60, 61 and 62.

In the exemplary embodiments, the data collected by the data capture arrangement 10 is used to calculate an efficiency score relating to aircraft separation. Arriving aircraft must maintain a minimum separation for safety reasons. However, any additional space above the minimum separation results in inefficient operation because more aircraft could be placed in the landing pattern if the spacing between aircraft were smaller. Thus, the exemplary embodiments calculate an efficiency score to measure the aircraft separation. Subsequently, efficiency scores are stored in the database 32 for comparison to future efficiency scores. A current efficiency score may then be compared to one or more previous efficiency scores to provide deeper context for the current efficiency score and thus make it more informative.

Figure 2:
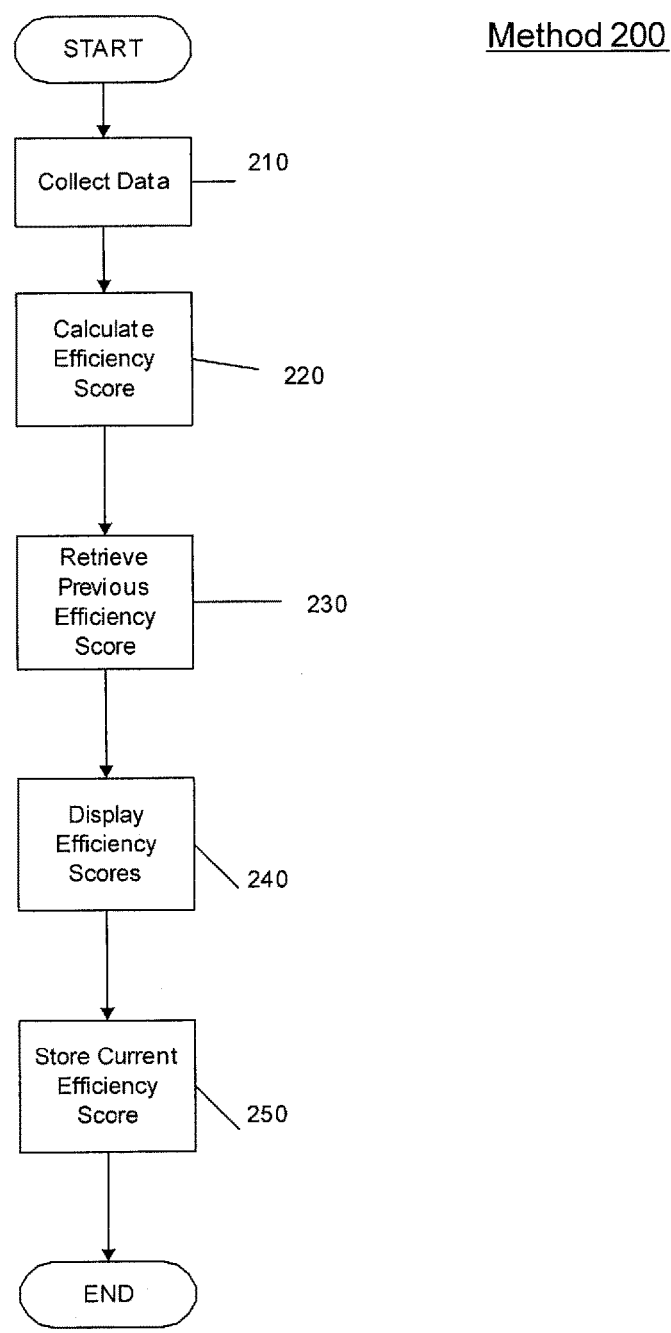
FIG. 2 shows an exemplary embodiment of a method according to the present invention.

FIG. 2 shows a first exemplary method 200 for comparing a current efficiency score to previous efficiency scores. In step 210, data is collected. Typically, this may be performed over a predetermined time interval, which may be determined based on a variety of factors. The time interval may be defined as a block of time, such as 1 hour, 3 hours, or 5 hours. Alternately, the time interval may be defined as a preset number of landings (e.g., 50 landings, 100 landings, etc.). In other examples, the time interval may be defined as a high demand period (e.g., between 8 am and 8 pm) or as a particular time period of interest input by a user. Collection may typically be performed by the data capture arrangement 10.

In step 220, a current efficiency score is calculated. In one exemplary embodiment, this may be accomplished by comparing the actual spacing between aircraft landings (e.g., as observed in step 210) to a calculated minimum spacing between landings over the predetermined time interval discussed above. Those of ordinary skill in the art will understand that the minimum spacing will be determined in order to maintain a safe separation between aircraft, and may be based on factors such as a weather condition at the airport, a type of the aircraft, a size of the aircraft, etc. For example, the efficiency score may be calculated by dividing a cumulative minimum spacing over the selected time interval by a cumulative actual spacing over the same time interval. However, those of skill in the art will understand that this method of calculating an efficiency score is only exemplary, and that the principles of the present invention may be applied to any method of calculating an efficiency score.

In step 230, a previous efficiency score is retrieved. The previous efficiency score may typically be stored by database 32 and retrieved in response to a request from one of the users 60, 61 and 62 sent via the data processing unit 30. The previous efficiency score may be chosen by any criteria that may aid in the selection of a previous efficiency score that can provide a context that is useful for the evaluation of the current efficiency score.

In one exemplary embodiment, the previous efficiency score retrieved in step 230 may be based purely on a temporal aspect (e.g., time or date). In one example of such an embodiment, the previous efficiency score may be that from the same time period on the immediately previous day. In another example, it may be from the same time period on the same day of the previous week. In another example, it may be from the same date in the previous year. Thus, a current efficiency score that appears to indicate that the airport is operating inefficiently may be shown to actually indicate that the airport is operating more efficiently than normal for a given time interval. For example, certain dates of the year (e.g., the day before Thanksgiving, the day after Christmas) are considered high travel days; high volume of travel may be one factor resulting in inefficiency. While an efficiency score calculated on one of these days may appear to be poor, by evaluating it in the context of a similar day, greater meaning may be achieved.

In another exemplary embodiment, the processing unit 30 may retrieve a previous efficiency score in step 230 based on a special condition or scenario existing at an airport. The condition may be a weather condition (e.g., rain, snow, fog, lightning, etc.), an airport operating condition (e.g., unavailability of one or more runways), or another type of condition that may affect the efficiency of airport operation. Thus, while a current efficiency score calculated on a snowy day may appear to indicate, when viewed on its own, that an airport is operating inefficiently, comparison to an efficiency score from a previous snowy day may indicate that the airport is performing efficiently.

In the exemplary embodiment discussed above, the processing unit 30 retrieves a single previous efficiency score in step 230. However, in other embodiments of the present invention, a plurality of previous efficiency scores may be retrieved. In such embodiments, the current efficiency score may be compared to each of the plurality of previous efficiency scores separately, or a composite may be generated from the previous efficiency scores (e.g., an unweighted average, a weighted average weighted to favor more recent data, etc.) for comparison with the current efficiency score.

In step 240, the current efficiency score (calculated in step 220) and the previous efficiency score (retrieved in step 230) are displayed to the user 60, 61 or 62. The display may show each efficiency score numerically, may show each efficiency score graphically, may represent the current efficiency score as a value normalized to the previous efficiency score (e.g., if the previous efficiency score is 60 and the current efficiency score is 75, the scores may be represented as a combined value of 75 divided by 60, or 1.25), or in any other matter which represents the scores to the user. In step 250, the current efficiency score calculated in step 220 is stored. In the exemplary system 1 of FIG. 1, storage would occur in database 32. By storing the current efficiency, it may then be used as a point of reference for future comparisons.

In another exemplary embodiment, the user may select a time interval for storage and future comparison. In such an embodiment, the user may select the interval (e.g., by clicking on a display representation of the interval with a mouse cursor), assign the interval a name, and select the interval for future use (e.g., by the use of a drop-down menu).

Figure 3:
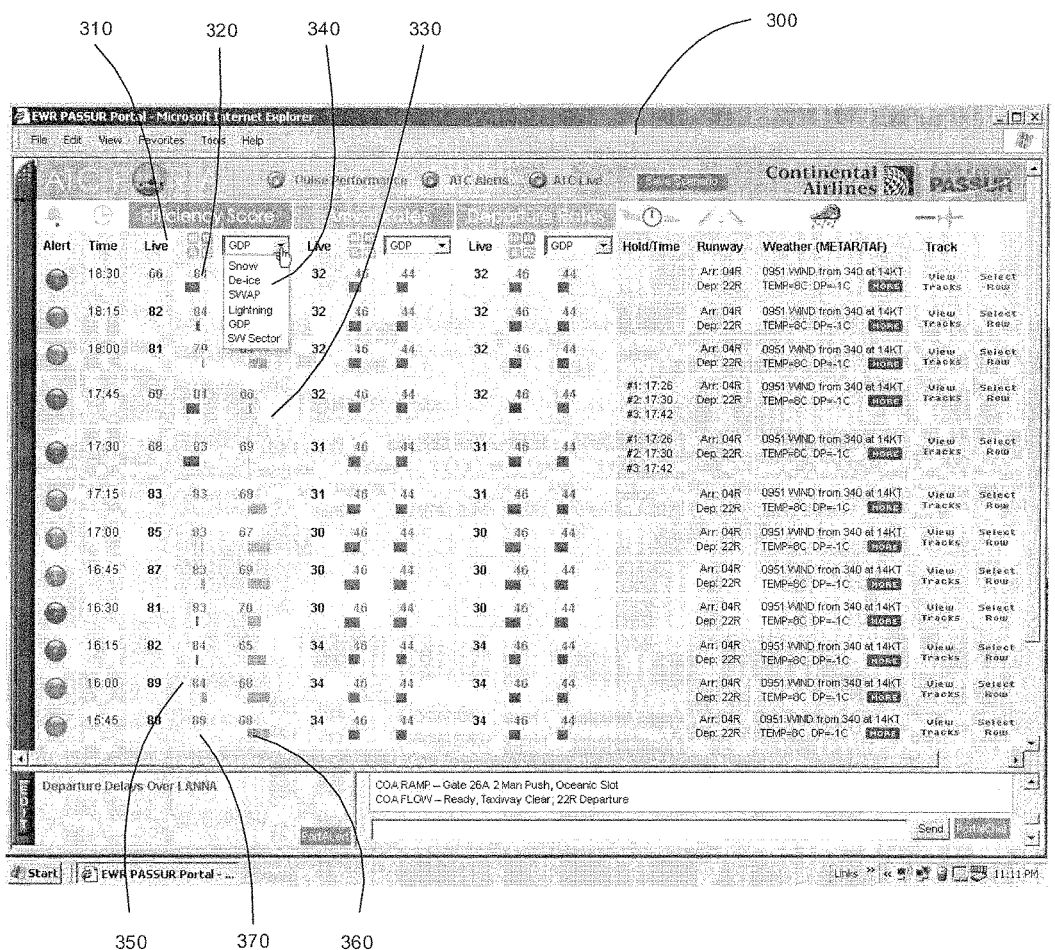
FIG. 3 shows an exemplary display shown to a user according to the present invention.

FIG. 3 shows an exemplary display 300 seen by one of the users 60, 61, and 62. The display 300 may include a column of current efficiency scores 310. In this exemplary display, the column 310 shows efficiency scores for a number of 15-minute intervals. The display 300 may also include a column of previous time-based efficiency scores 320. In this exemplary embodiment, the user may elect to display efficiency scores for the same time period over the previous week, month, 6 months or 12 months. The display 300 may further include a column of previous scenario-based efficiency scores 330. The user may select a scenario by choosing an entry from the drop box 340.

In this exemplary display, the previous efficiency scores are displayed as numbers 350; additionally, the display may include bar graphs 360 extending from centerlines 370. In this exemplary embodiment, the bar graphs 360 extend from the centerlines to the left if the current efficiency scores 310 are worse than the previous efficiency scores 320 and 330, and to the right if they are better. The size of the bar graphs 360 may represent the degree of difference. In another exemplary embodiment, the bar graphs 360 or numerical displays 310, 320 and 330 may be color-coded (e.g., displayed in green if the current efficiency score 310 is better than previous efficiency scores, displayed in black if the current efficiency score 310 is the same, displayed in red if the current efficiency score 310 is worse, etc.)

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
   determining, by a computer processor, a current efficiency score for an airport, wherein determining the current efficiency score comprises the following substeps:
   determining a minimum spacing requirement between each of a plurality of subsequent aircraft landings occurring within a user-defined time interval;
   determining position information for each of a plurality of aircrafts relative to a reference location, wherein the plurality of aircrafts correspond to the plurality of aircraft landings and wherein the position information for each of the plurality of aircrafts is based on when a first signal is received by a first radar from a second radar, when a second signal is received by the first radar from one of the plurality of aircrafts, the distance between the first radar and the second radar and the direction between the first radar and the second radar;
   determining an actual spacing between each of the plurality of subsequent aircraft landings occurring within the user-defined time interval based on the position information; and
   calculating the current efficiency score based on the difference between the actual spacing and the minimum spacing requirements for the plurality of subsequent aircraft landings occurring within the user-defined time interval;
   receiving a request to compare the current efficiency score with a previous efficiency score, the request including a user-defined input for retrieving the previous efficiency score over a second user-defined time interval;
   retrieving, from a non-transitory computer memory, the previous efficiency score; and
   displaying the current efficiency score and the previous efficiency score to a user.

2. The method of claim 1, wherein the previous efficiency score comprises an average of a plurality of previous efficiency scores.

3. The method of claim 2, wherein the average is one of weighted and unweighted.

4. The method of claim 1, wherein the previous efficiency score is selected based on time.

5. The method of claim 4, wherein the previous efficiency score is one of the same day of the week, the previous week, the previous six months, the previous year, and the same date in the previous year.

6. The method of claim 1, wherein the previous efficiency score is selected based on an operational condition.

7. The method of claim 6, wherein the operational condition is one of a weather-related condition and an airport operating condition.

8. The method of claim 1, further comprising storing the current efficiency score.

9. A system, comprising:
   a non-transitory computer memory that stores a database, the database storing a plurality of previous efficiency scores for an airport;
   a calculation arrangement calculating a current efficiency score for the airport and retrieving a previous efficiency score from the database, the previous efficiency score being retrieved over a user-defined time interval based upon a user-defined input , wherein the calculation arrangement calculates the current efficiency score by:
   determining a minimum spacing requirement between each of a plurality of subsequent aircraft landings occurring within a second user-defined time interval;
   determining position information for each of a plurality of aircrafts relative to a reference location, wherein the plurality of aircrafts correspond to the plurality of aircraft landings and wherein the position information for each of the plurality of aircrafts is based on when a first signal is received by a first radar from a second radar, when a second signal is received by the first radar from one of the plurality of aircrafts, the distance between the first radar and the second radar and the direction between the first radar and the second radar;
   determining an actual spacing between each of the plurality of subsequent aircraft landings occurring within the second user-defined time interval based on the position information; and
   calculating the current efficiency score based on the difference between the actual spacing and the minimum spacing requirements for the plurality of subsequent aircraft landings occurring within the second user-defined time interval; and
   a data distribution arrangement for generating a displayable file and distributing the current efficiency score and the one of the plurality of previous efficiency scores to a user of the system.

10. The system of claim 9, wherein the retrieved previous efficiency score comprises an average of a plurality of previous efficiency scores.

11. The system of claim 10, wherein the average is one of weighted and unweighted.

12. The system of claim 9, wherein the retrieved previous efficiency score is selected from the plurality of previous efficiency scores based on time.

13. The system of claim 12, wherein the retrieved previous efficiency score is one of the same day of the week, the previous week, the previous six months, the previous year, and the same date in the previous year.

14. The system of claim 9, wherein the retrieved previous efficiency score is selected based on an operational condition.

15. The system of claim 14, wherein the operational condition is one of a weather-related condition and an airport operating condition.

16. The system of claim 9, wherein the calculation arrangement is further configured to store the current efficiency score in the database.

17. A non-transitory computer readable storage medium including a set of instructions executable by a processor, the set of instructions operable to:
   determine a current efficiency score for an airport, wherein the current efficiency score is determined by:
   determining a minimum spacing requirement between each of a plurality of subsequent aircraft landings occurring within a user-defined time interval;
   determining position information for each of a plurality of aircrafts relative to a reference location, wherein the plurality of aircrafts correspond to the plurality of aircraft landings and wherein the position information for each of the plurality of aircrafts is based on when a first signal is received by a first radar from a second radar, when a second signal is received by the first radar from one of the plurality of aircrafts, the distance between the first radar and the second radar and the direction between the first radar and the second radar;

determining an actual spacing between each of the plurality of subsequent aircraft landings occurring within the user-defined time interval based on the position information; and calculating the current efficiency score based on the difference between the actual spacing and the minimum spacing requirements for the plurality of subsequent aircraft landings occurring within the user-defined time interval;

receive a request for a previous efficiency score for the airport, the request including a user-defined input for retrieving the previous efficiency score over a second user-defined time interval;

retrieve the previous efficiency score; and display the current efficiency score and the previous efficiency score to a user.

18. The method of claim 1, wherein the user-defined time interval comprises a block of time.

19. The method of claim 1, wherein the user-defined time interval comprises a number of landings.

20. The method of claim 1, wherein the user-defined time interval comprises selecting a start time and an end time.

* * * * *